United States Patent [19]
Arimilli et al.

[11] Patent Number: 5,940,864
[45] Date of Patent: Aug. 17, 1999

[54] SHARED MEMORY-ACCESS PRIORIZATION METHOD FOR MULTIPROCESSORS USING CACHES AND SNOOP RESPONSES

[75] Inventors: Ravi Kumar Arimilli, Austin; John Steven Dodson, Pflugerville; John Michael Kaiser, Cedar Park; Jerry Don Lewis, Round Rock, all of Tex.

[73] Assignee: International Business Machines Corporation, Armonk, N.Y.

[21] Appl. No.: 08/837,511

[22] Filed: Apr. 14, 1997

[51] Int. Cl.$^6$ ................................... G06F 12/00
[52] U.S. Cl. ................ 711/163; 711/158; 711/144; 711/118
[58] Field of Search ................ 711/144, 158, 711/118, 163

[56] References Cited

U.S. PATENT DOCUMENTS

| | | | |
|---|---|---|---|
| 5,210,845 | 5/1993 | Crawford et al. | 395/425 |
| 5,319,766 | 6/1994 | Thaller et al. | 395/425 |
| 5,404,489 | 4/1995 | Woods et al. | 395/425 |
| 5,528,764 | 6/1996 | Heil | 395/293 |
| 5,553,266 | 9/1996 | Metzger et al. | 395/471 |
| 5,555,382 | 9/1996 | Thaller et al. | 395/293 |
| 5,559,987 | 9/1996 | Foley et al. | 395/471 |
| 5,657,472 | 8/1997 | Van Loo et al. | 711/158 |
| 5,809,536 | 9/1998 | Young et al. | 711/144 |

*Primary Examiner*—John W. Cabeca
*Assistant Examiner*—David Langjahr
*Attorney, Agent, or Firm*—Richard A. Henkler; Jack V. Musgrove; Andrew J. Dillon

[57] ABSTRACT

A method of reducing memory latency associated with a read-type operation in a multiprocessor computer system is disclosed. When a requesting processing unit issues a message indicating that it desires to read a value from an address of a memory device of the computer system, each cache snoops an interconnect to detect the message, and transmits a response to the message, wherein a shared intervention response is transmitted to indicate that a cache containing an unmodified value corresponding to the address of the memory device can source the value. A priority is associated with each response, and system logic detects each response and its associated priority, and forwards a response with a highest priority to the requesting processing unit. The protocol may include prior-art coherency responses such as an invalid response, a modified intervention response, a shared response, and a retry response. Either the retry response or the shared intervention response may be assigned a highest priority. Since the cache latency can be much less than the memory latency, the read performance can be substantially improved with this new protocol.

20 Claims, 2 Drawing Sheets

SHARED MEMORY-ACCESS PRIORIZATION METHOD FOR MULTIPROCESSORS USING CACHES AND SNOOP RESPONSES

BACKGROUND OF THE INVENTION

1. Field of the Invention

The present invention generally relates to computer systems and, more particularly, to a method of improving performance of memory read-type operations in symmetric multiprocessor computer systems using intervention when an issuing processor desires to read data which can be found in an unmodified state in a cache of another processor.

2. Description of the Related Art

The basic structure of a conventional multi-processor computer system 10 is shown in FIG. 1. Computer system 10 has several processing units, two of which, 12a and 12b, are depicted, which are connected to various peripheral devices including input/output (I/O) devices 14 (such as a display monitor, keyboard, graphical pointer (mouse), and a permanent storage device (hard disk)), memory device 16 (such as random access memory or RAM) that is used by the processing units to carry out program instructions, and firmware 18 whose primary purpose is to seek out and load an operating system from one of the peripherals (usually the permanent memory device) whenever the computer is first turned on. Processing units 12a and 12b communicate with the peripheral devices by various means, including a generalized interconnect or bus 20, or direct-memory-access channels (not shown). Computer system 10 may have many additional components which are not shown, such as serial and parallel ports for connection to, e.g., modems or printers. Those skilled in the art will further appreciate that there are other components that might be used in conjunction with those shown in the block diagram of FIG. 1; for example, a display adapter might be used to control a video display monitor, a memory controller can be used to access memory 16, etc. The computer also can have more than two processing units.

In a symmetric multi-processor (SMP) computer, all of the processing units are generally identical; that is, they all use a common set or subset of instructions and protocols to operate, and generally have the same architecture. A typical architecture is shown in FIG. 1. A processing unit includes a processor core 22 having a plurality of registers and execution units, which carry out program instructions in order to operate the computer. An exemplary processing unit includes the PowerPC™ processor marketed by International Business Machines Corporation. The processing unit also can have one or more caches, such as an instruction cache 24 and a data cache 26, which are implemented using high-speed memory devices. Caches are commonly used to temporarily store values that might be repeatedly accessed by a processor, in order to speed up processing by avoiding the longer step of loading the values from memory 16. These caches are referred to as "on-board" when they are integrally packaged with the processor core on a single integrated chip 28. Each cache is associated with a cache controller (not shown) that manages the transfer of data and instructions between the processor core and the cache memory.

A processing unit can include additional caches, such as cache 30, which is referred to as a level 2 (L2) cache since it supports the on-board (level 1) caches 24 and 26. In other words, cache 30 acts as an intermediary between memory 16 and the on-board caches, and can store a much larger amount of information (instructions and data) than the on-board caches can, but at a longer access penalty. For example, cache 30 may be a chip having a storage capacity of 256 or 512 kilobytes, while the processor may be an IBM PowerPC™ 604-series processor having on-board caches with 64 kilobytes of total storage. Cache 30 is connected to bus 20, and all loading of information from memory 16 into processor core 22 must come through cache 30. Although FIG. 1 depicts only a two-level cache hierarchy, multi-level cache hierarchies can be provided where there are many levels (L3, L4, etc.) of serially connected caches.

In an SMP computer, it is important to provide a coherent memory system, that is, to cause writes to each individual memory location to be serialized in some order for all processors. In a cache-coherent system, all processors will observe the writes to a given location to take place in the order indicated. There are a number of protocols and techniques for achieving cache coherence that are known to those skilled in the art. At the heart of all these mechanisms for maintaining coherency is the requirement that the protocols allow only one processor to have a "permission" that allows a write to a given memory location (cache block) at any given point in time. As a consequence of this requirement, whenever a processing element attempts to write to a memory location, it must first inform all other processing elements of its desire to write the location and receive permission from all other processing elements to carry out the write. All other processors in the system must be informed of the write by the initiating processor before the write occurs. Furthermore, if a block is present in the L1 cache of a given processing unit, it also is present in the L2 and L3 caches of that processing unit. This property is known as inclusion and is well known to those skilled in the art.

To implement cache coherency in a system, the processors communicate over a common generalized interconnect (i.e., bus 20). The processors pass messages over the interconnect indicating their desire to read or write memory locations. When an operation is placed on the interconnect, all of the other processors "snoop" (monitor) this operation and decide if the state of their caches can allow the requested operation to proceed and, if so, under what conditions. There are several bus transactions that require snooping and follow-up action to honor the bus transactions and maintain memory coherency. Snoop responses are collected and analyzed by system logic which typically resides in a system control point unit 32. The snooping operation is triggered by the receipt of a qualified snoop request, generated by the assertion of certain bus signals. This communication is necessary because, in systems with caches, the most recent valid copy of a given block of memory may have moved from the system memory 16 to one or more of the caches in the system. If a processor (say 12a) attempts to access a memory location not present within its cache hierarchy, the correct version of the block, which contains the actual (current) value for the memory location, may either be in the system memory 16 or in one or more of the caches in another processing unit, e.g., processing unit 12b. If the correct version is in one or more of the other caches in the system, it is necessary to obtain the correct value from the cache(s) in the system instead of system memory.

For example, consider a processor, say 12a, attempting to read a location in memory. It first polls its own L1 cache (24 or 26). If the block is not present in the L1 cache, the request is forwarded to the L2 cache (30). If the block is not present in the L2 cache, the request is forwarded on to lower-level caches, e.g., the L3 cache. If the block is not present in a lower-level cache, the request is then presented on the generalized interconnect (20) to be serviced. Once an operation has been placed on the generalized interconnect, all other lower-level caches snoop the operation and determine if the block is present in their caches. If a given processing unit has the block requested by processing unit in its L1 cache, and the value in that block is modified, by the principle of inclusion the L2 cache and any lower-level caches also have copies of the block (however, their copies may be stale, since the copy in the processor's cache is modified). Therefore, when the lowest level cache (e.g., L3) of the processing unit snoops the read operation, it will determine that the block requested is present and modified in a higher-level cache. When this occurs, the L3 cache places a message on the generalized interconnect informing the processing unit that it must "retry" its operation again at a later time, because the actual value of the memory location is in the L1 cache at the top of the memory hierarchy and must be retrieved to make it available to service the read request of the initiating processing unit.

Once the request from an initiating processing unit has been retried, the L3 cache begins a process to retrieve the modified value from the L1 cache and make it available at the L3 cache, main memory, or both, depending on the exact details of the implementation which are not specifically relevant to this invention. To retrieve the block from the higher-level caches, the L3 cache sends messages through the inter-cache connections to the higher-level caches, requesting that the block be retrieved. These messages propagate up the processing unit hierarchy until they reach the L1 cache and cause the block to be moved down the hierarchy to the lowest level (L3 or main memory) to be able to service the request from the initiating processing unit.

The initiating processing unit eventually retries the read request on the generalized interconnect. At this point, however, the modified value has been retrieved from the L1 cache of a processing unit, and the read request from the initiating processor will be satisfied. The scenario just described is referred to commonly as a "snoop push." A read request is snooped on the generalized interconnect which causes the processing unit to "push" the block to the bottom of the hierarchy to satisfy the read request made by the initiating processing unit.

When a processor wishes to read or write a block, it must communicate that desire with the other processing units in the system in order to maintain cache coherence. To achieve this, the cache-coherency protocol associates with each block in each level of the cache hierarchy, a status indicator indicating the current "state" of the block. The state information is used to allow certain optimizations in the coherency protocol that reduce message traffic on the generalized interconnect and the inter-cache connections. As one example of this mechanism, when a processing unit executes a read, it receives a message indicating whether or not the read must be retried later. If the read operation is not retried, the message also usually includes information allowing the processing unit to determine if any other processing unit also has a still-active copy of the block (this is accomplished by having the other lowest-level caches give a "shared" or "not shared" indication for any read they do not retry). Therefore, a processing unit can determine whether any other processor in the system has a copy of the block. If no other processing unit has an active copy of the block, the reading processing unit marks the state of the block as "exclusive." If a block is marked exclusive, it is permissible to allow the processing unit to later write the block without first communicating with other processing units in the system because no other processing unit has a copy of the block. Therefore, it is possible for a processor to read or write a location without first communicating this intention onto the interconnection, but only where the coherency protocol has ensured that no other processor has an interest in the block.

The foregoing cache-coherency technique is implemented in a specific protocol referred to as "MESI," and illustrated in FIG. 2. In this protocol, a cache block can be in one of four states, "M" (Modified), "E" (Exclusive), "S" (Shared) or "I" (Invalid). Under the MESI protocol, each cache entry (e.g., a 32-byte sector) has two additional bits which indicate the state of the entry, out of the four possible states. Depending upon the initial state of the entry and the type of access sought by the requesting processor, the state may be changed, and a particular state is set for the entry in the requesting processor's cache. For example, when a sector is in the Modified state, the addressed sector is valid only in the cache having the modified sector, and the modified value has not been written back to system memory. When a sector is Exclusive, it is present only in the noted sector, and is consistent with system memory. If a sector is Shared, it is valid in that cache and in at least one other cache, all of the shared sectors being consistent with system memory. Finally, when a sector is Invalid, it indicates that the addressed sector is not resident in the cache. As seen in FIG. 2, if a sector is in any of the Modified, Shared, or Invalid states, it can move between the states depending upon the particular bus transaction. While a sector in an Exclusive state can move to any other state, a sector can only become Exclusive if it is first Invalid.

A further improvement in accessing cache blocks can be achieved using the aforementioned cache-coherency protocol. This improvement, referred to as "intervention," allows a cache having control over a Modified memory block to provide the data or instruction in that block directly to another cache requesting the value (for a read-type operation), in other words, bypassing the need to write the data or instruction to system memory and then have the requesting processor read it back again from memory. Intervention can only be performed by a cache having the value in a block whose state is Modified. In this state, there is only one cache block that has a valid copy of the value, so it is a simple matter to source the value over the bus 20 without the necessity of first writing it to system memory. The intervention procedure thus speeds up processing by avoiding the longer process of writing to and reading from system memory (which actually involves three bus operations and two memory operations). This procedure not only results in better latency, but also increased usable bus bandwidth.

Prior-art protocols do not provide for intervention when data or instructions are held in an unmodified (i.e., Shared or Exclusive) state. One approach would be to treat the shared cache block as being in a Modified state, which would allow that value to be sourced by the cache containing the value, but then the value also would be written to system memory, which is unnecessary and can lead to further delays. It would, therefore, be desirable to devise a method of maintaining cache coherency which allowed for efficient intervention of unmodified data or instructions. It would be further advantageous if the method could be implemented in a manner simplifying intervention of values regardless of the particular type of unmodified state (i.e., Shared or Exclusive or any other unmodified state).

SUMMARY OF THE INVENTION

It is therefore one object of the present invention to provide an improved method of carrying out read-type operations in a multi-processor computer system.

It is another object of the present invention to provide such a method that allows for improved intervention response when the target value can be found in an unmodified state in a cache of another processor.

It is yet another object of the present invention to provide such a method that can be efficiently implemented with a cache-coherency protocol defining multiple states for values held unmodified in cache blocks.

The foregoing objects are achieved in a method of improving memory latency associated with a read-type operation in a multiprocessor computer system, generally comprising the steps of a requesting processing unit issuing a message to a bus of the computer system indicating that the requesting processing unit desires to read a value from an address of a memory device of the computer system, each cache snooping the bus to detect the message, each cache transmitting a response to the message, wherein a shared intervention response is transmitted to indicate that a cache containing an unmodified value corresponding to the address of the memory device can source the value, associating a priority with each response from each cache, detecting each response and its associated priority, and forwarding a response with a highest priority to the requesting processing unit. An invalid response may be transmitted to indicate that a cache does not contain any value corresponding to the address of the memory device, a modified intervention response may be transmitted to indicate that a cache containing a modified value corresponding to the address of the memory device can source the value, a shared response may be transmitted to indicate that a cache containing an unmodified value corresponding to the address of the memory device will not source the value, and a retry response may be transmitted to indicate that a cache desires the requesting processor to re-issue the message. Either the retry response or the shared intervention response may be assigned a highest priority. Since the cache latency can be much less than the memory latency, the read performance can be substantially improved with this new protocol.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF THE PREFERRED EMBODIMENT

Figure 1:
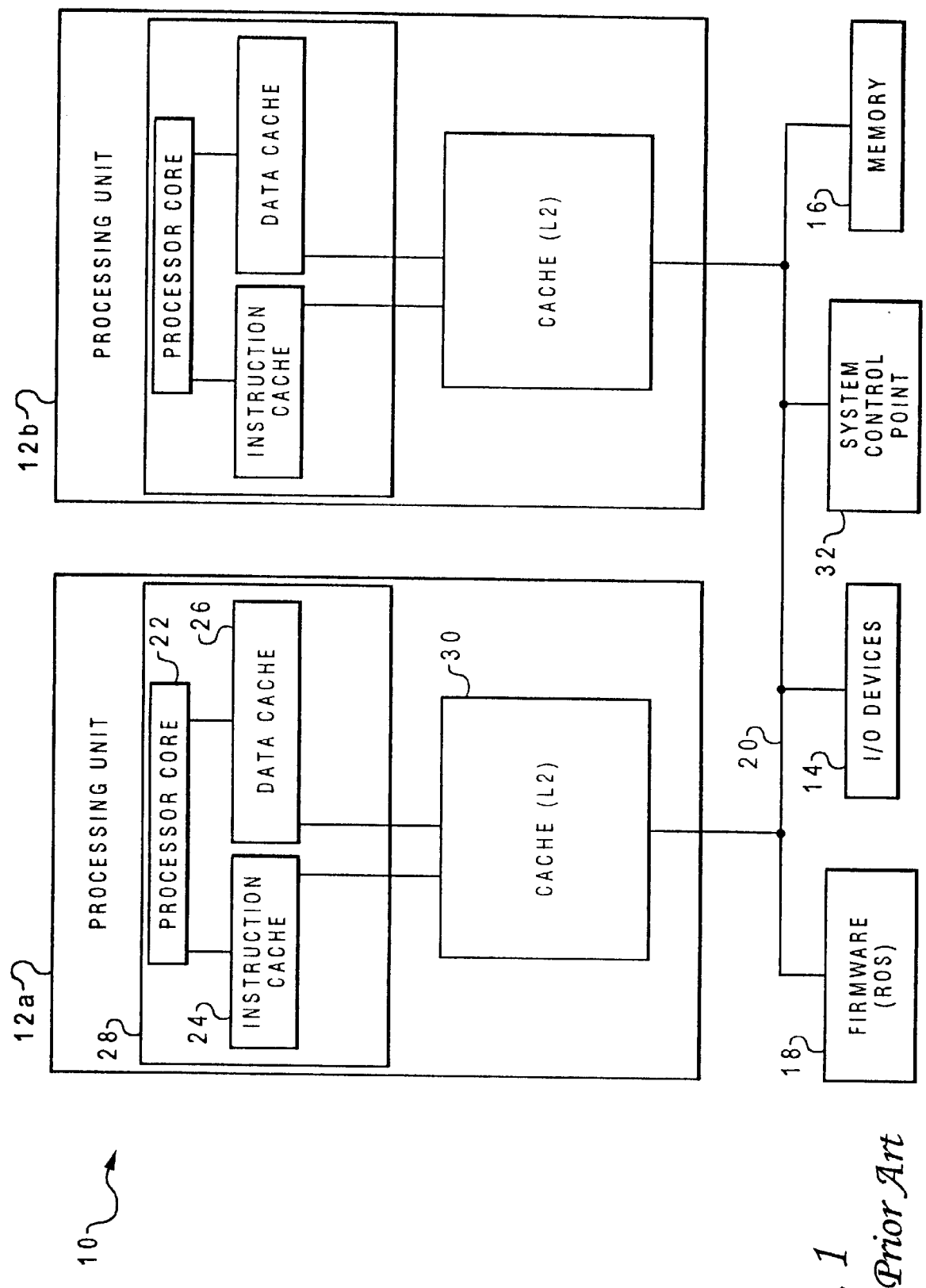
FIG. 1 is a block diagram of a prior-art multi-processor computer system.

The present invention is directed to a method of executing read-type instructions in a multi-processor system, such as the system of FIG. 1, but the present invention could be applied to computer systems that are not necessarily conventional, i.e., they could include new hardware components not shown in FIG. 1, or have a novel interconnection architecture for existing components. Therefore, those skilled in the art will appreciate that the present invention is not limited to the generalized system shown in that figure.

In the present invention, a protocol is established to pass coherency responses to a processor requesting a read operation, from the snoopers of all caches associated with other processors in the multiprocessor computer system. The responses are formulated in accordance with Table 1:

TABLE 1

| Address Response | Priority | Definition |
| --- | --- | --- |
| 000 | — | Reserved |
| 001 | 3 (1) | Shared Intervention |
| 010 | 6 | Remote Status |
| 011 | 4 | Rerun |
| 100 | 1 (2) | Retry |
| 101 | 2 (3) | Modified Intervention |
| 110 | 5 | Shared |
| 111 | 7 | Null or Clean |

The signals take the form of a 3-bit snoop response, whose value (address response) and definition are set forth in Table 1. These signals are encoded to indicate the snoop result after the address tenure. Table 1 shows responses, similar to those used in the prior art, for a shared line, a modified line, and a clean (invalid) line, as well as a retry response. Table 1 also shows three new responses, "shared intervention," "remote status" and "rerun." The remote status response, which is only used for read operations, is used to indicate that the read will be successful, and the coherency response of either Shared or Exclusive will be returned later with the data using another signal. The rerun response is used when the coherency response cannot be determined immediately and the request must be forwarded lower in the hierarchy. The rerun response differs from retry in that the former message must be reissued and it must have the same identifier so it can be matched up with the previously forwarded message.

The shared intervention response allows a cache to source a value when it has a copy of data or an instruction which has yet to be modified, and so is differentiated from the prior-art modified intervention response. The shared intervention response may thus be used with any state indicating an unmodified value, including the Shared state and the Exclusive state, as well as a new state introduced below (the "R" state, for Recently read). This response tells the requesting processor to look for the read reply data or instruction on the bus (generalized interconnect), which is tagged with its request identifier, and a signal that it is a value from cache and not memory. The term bus is used in a general sense and there may be several "busses" that are provided, such as a snoop bus for relaying requests and response messages, and one or more other value busses connected to a crosspoint.

The reply is tagged with an 8-bit value on a separate data tag bus which tracks the data bus cycle for cycle. A value on the data tag bus indicates that the data on the data bus belongs to a message with the same value sent on the address bus. There is an additional signal "cache data not memory data" (DCache) which is enabled during interventon to indicate that this data is from the cache and not from memory. The memory or cache theoretically could begin to send data before the intervention response is seen by the requestor, so if Dcache is enabled it indicates the latest data is being sent and, if disabled, it must wait for the response to see if intervention is occurring and if so discard the data and wait for the data marked with the DCache (and same matching data tag). In addition, this new response will tell the memory system to drop the read request as it can be satisfied by the intervention of another cache. Since the cache latency can be much less than the memory latency, the read performance can be substantially improved with this new protocol. Those skilled in the art will appreciate that this improvement can be provided with variations of the foregoing protocol, e.g., wherein there are still invalid, modified intervention, and shared intervention responses, along with other alternative responses, including any of the other responses identified above.

A value may further be associated with each response to allow system logic to determine which of the responses should take priority in formulating a single response to the requesting processor, as shown in Table 1. For example, if one or more caches respond with a shared intervention response (priority 3), and one or more caches respond with a retry response (priority 1), then the retry response will take priority and the system logic will issue the retry response to the requesting processor. This system logic may reside in various components, such as a system control point unit, or even within the memory controller. The primary values shown for priorities in Table 1 provide the highest priority for the retry response, similar to the prior art. However, an alternative priority scheme may be provided to enhance the use of the shared intervention protocol. In this alternative, indicated by the priority numbers in parentheses in Table 1, the shared intervention response has the highest priority, followed by the retry response, and further followed by the modified intervention response; all other priorities are the same as with the first scheme. In this alternate scheme, a shared intervention response will always override other responses, which is acceptable for many reasons. First of all, if a cache line is holding a value (data or instruction) in a shared state, then no other caches may hold a value corresponding to the same address in a modified state, and so it is clear that no other caches will be able to respond with a modified intervention response. Also, if any other cache issues a retry, then any later response from that same cache based on the retry could at most be shared, which again means that it is acceptable to issue the shared intervention response in the first place.

Figure 2:
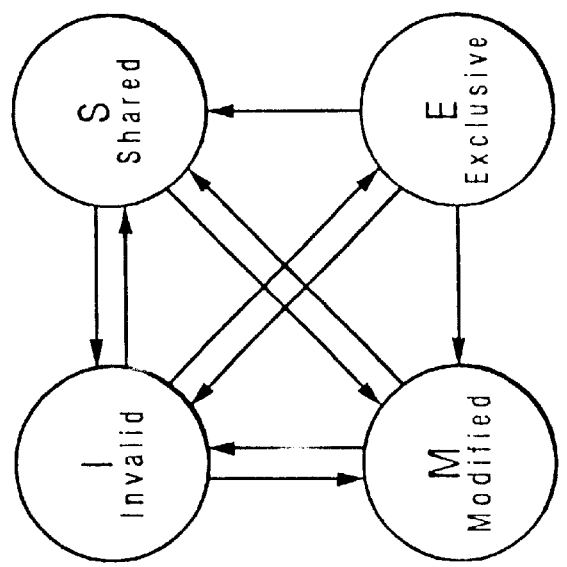
FIG. 2 is a state diagram depicting a prior-art cache-coherency protocol (MESI)

In the present invention, several different mechanisms may be employed to ascertain which cache is the "owner" of the unmodified value and therefore entitled to source it. If the computer system uses the prior-art MESI protocol shown in FIG. 2 and a cache line holds a value in the Exclusive state, then that cache is the only one that contains a valid copy of the value, and so that cache is clearly the owner and can issue the shared intervention response. If, however, a cache line holds a value in the Shared state, then it also is held in at least one other cache in the same state, and so it is not immediately clear which case should source the data. In such a case, several alternatives are available to determine which cache should be used. For example, multiple caches could respond with shared intervention, and then the system logic (e.g., the system control point) could choose which cache will source the value. In this case, the system could return a retry response to all except one of the potential owners, and return the shared intervention response only to the chosen owner. The owner might be chosen arbitrarily, or based on a fixed or rotating priority scheme.

Figure 3:
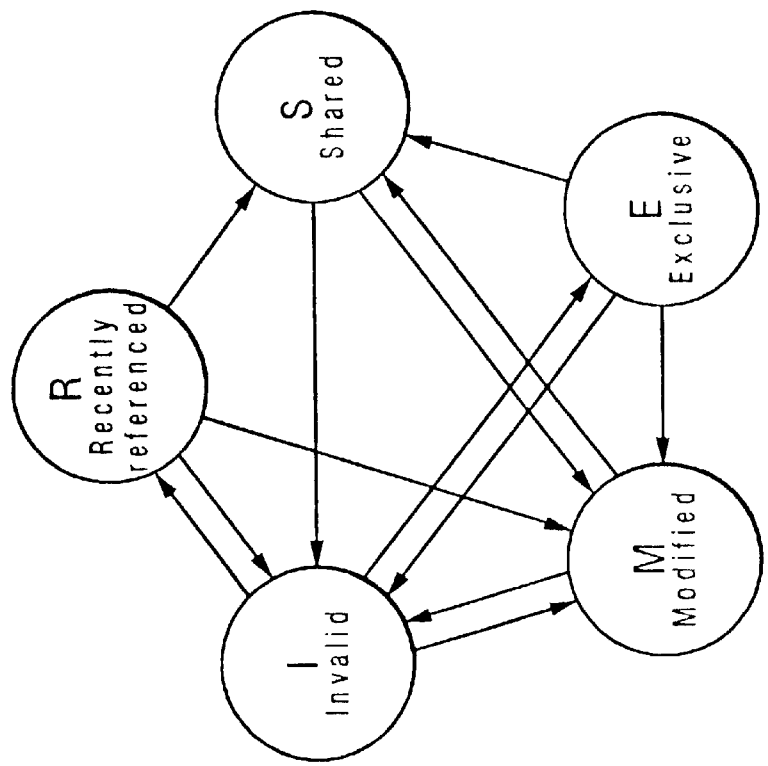
FIG. 3 is a state diagram depicting a novel cache-coherency protocol which may be used to carry out the present invention.

Another method of determining the owner among a plurality of caches containing a shared value is to provide a mechanism to indicate which specific cache most recently has read the cache line. That cache then is automatically considered the owner of this line until another cache reads it or it is discarded. This method may be implemented with a new cache-coherency protocol depicted in the state diagram of FIG. 3. This protocol is similar to the prior-art MESI protocol of FIG. 2, in that it includes the same four states (Modified, Exclusive, Shared, and Invalid), but it also includes a new "R" state (Recent), for providing an indication of the most recently referenced block that would otherwise have a shared indication. In other words, when two or more caches hold valid copies of an instruction or data value, all of them will be in the Shared state except for the cache which most recently accessed the instruction or data value, and that cache will be in the Recent state. Since there are now five possible total states, each cache entry requires a three-bit field (instead of a two-bit field as in the prior art) to identify which state the entry possesses.

This new protocol is referred to herein as the "R-MESI" protocol. As with the prior-art protocol, the four M-E-S-I states may change based on the initial state of the entry and the type of access sought by the requesting processor. The manner in which these four states change is generally identical to the prior-art MESI protocol, with the exceptions noted below. Table 2 shows the master cache state transitions for read-type operations, where a "miss" occurs:

TABLE 2

| | Bus Operation | Master State | Coherency Response |
|---|---|---|---|
| 1 | Read | I → R | ShrI, Shr, or Mod |
| 2 | RWITM | I → E | ShrI, Shr, or Null |
| 3 | Read | I → E | Null |
| 4 | RWITM | I → M | Mod |

The Recent state is entered on a "Read miss" bus operation (the first row of Table 2) if the coherency response is Modified (Mod), Shared (Shr), or Shared-Intervention (ShrI); if the response is Modified on a "Read miss" operation, the modified cache will send the instruction or data to memory also, so it is no longer Modified. If there is no coherency response (Null) on a "Read miss" operation (the third row of Table 2), then the Exclusive state is entered as with the prior-art MESI protocol. On an "RWITM miss" operation (RWITM is an abbreviation for Read With Intent To Modify), the Exclusive state is entered if the coherency response is Null, Shr, or ShrI (the second row of Table 2), and the Modified state is entered if the coherency response is Mod (the fourth row of Table 2). The RWITM cases apply only to data or instructions still being prepared for execution, since instructions once prepared for execution typically are not modified.

Table 3 shows an example of how the bus transactions influence the cache when acting as a snooper, for read-type operations (read hits):

TABLE 3

| | Bus Operation | Snooper State | Coherency Response |
|---|---|---|---|
| 1 | Read-Burst | R → S | ShrI |
| 2 | Read-Burst | E → S | ShrI |
| 3 | Read-Burst | M → S | Mod |
| 4 | RWITM | E or R → I | ShrI |
| 5 | RWITM | M → I | Mod |

For either an Exclusive or Recent beginning state (the first, second, and fourth rows of Table 3), the cache will transmit a Shared-Intervention coherency response, meaning that it will source its copy of the instruction or data via intervention directly to the requesting processor, without involvement from the system memory. Whenever an instruction is so sourced, the next state becomes Shared for a "Read hit" operation (the first and second rows of Table 3) or Invalid for a "RWITM hit" operation (the fourth row of Table 3). In those cases where the beginning state is Modified (the third and fifth rows of Table 3), which again do not apply in the case of instructions since program instructions are typically not modified, the coherency response will be Modified, and intervention still occurs. If the bus operation was a "RWITM," the value is only transferred from cache to cache, but if the bus operation was a read, the value is sent both to the cache and to memory.

As noted above, for those states and operations not shown in Tables 2 and 3, transitions and coherency responses are performed in accordance with the prior-art MESI protocol, with one qualification, namely, a cache entry can have an "R" state which is subjected to a write operation, and that entry will undergo a transition to a Modified state in a manner similar to that occurring when a Shared entry is subjected to a write operation. The following points might further be noted with respect to the R-MESI protocol: an entry can never go from Invalid to Shared (it would go to Recent instead); an entry can never go from Exclusive to Recent (it would go to Shared); an entry can never go from Recent to Exclusive (just as a Shared entry cannot go to Exclusive); and an entry can never go from Modified to Recent (it would go to Shared, while entry in the cache of the requesting processor would go to Recent).

With this new R-MESI protocol, the ownership of a block migrates to the last cache to read the instruction or data, which has the added benefit of staying most recently used and thereby lessening the chance of deallocation if a least recently used (LRU) cache replacement mechanism is employed. The "R" cache state also can be advantageously used for other applications, such as an intelligent input/output (I/O) controller interrupting the processor/cache which most recently has read a cached I/O status location, since this processor/cache would be most likely to have cached the I/O device driver code and, therefore, could execute the code faster than in another processor that needs to fetch the code into its cache.

By providing intervention for shared instructions and data (that is, instructions or data which are validly present in more than one cache) memory latency is significantly improved. In one evaluation of the R-MESI protocol, performance increased according to an industry standard benchmark from 5300 $TPM_C$ to 7500 $TPM_C$ (transactions per minute), when compared to the prior-art MESI protocol. Generally, the present invention frees up the memory controller, and demand on memory bandwidth is lessened.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. It is therefore contemplated that such modifications can be made without departing from the spirit or scope of the present invention as defined in the appended claims.

We claim:

1. A method of reducing memory latency associated with a read-type operation in a multiprocessor computer system having a plurality of processing units, each processing unit further having an associated cache, the method comprising the steps of:

a requesting processing unit issuing a message to an interconnect of the computer system, indicating that the requesting processing unit desires to read a value from an address of a memory device of the computer system;

each cache snooping the interconnect to detect the message;

each cache transmitting a response to the message, wherein a shared intervention response is transmitted from a particular one of the caches to indicate that the particular cache contains a shared, unmodified copy of a value corresponding to the address of the memory device and is the only cache entitled to directly source the value;

associating a priority with each response from each cache, including the shared intervention response;

detecting each response and its associated priority; and forwarding a response with a highest priority to the requesting processing unit.

2. The method of claim 1 wherein the shared intervention response is assigned a highest priority.

3. The method of claim 1 wherein an invalid response is transmitted to indicate that a cache does not contain any value corresponding to the address of the memory device.

4. The method of claim 1 wherein a modified intervention response is transmitted to indicate that a cache containing a modified value corresponding to the address of the memory device can source the value.

5. The method of claim 1 wherein a shared response is transmitted to indicate that a cache containing an unmodified value corresponding to the address of the memory device will not source the value.

6. The method of claim 1 wherein a retry response is transmitted to indicate that a cache desires the requesting processor to re-issue the message.

7. The method of claim 1 wherein:

an invalid response is transmitted to indicate that a cache does not contain any value corresponding to the address of the memory device;

a modified intervention response is transmitted to indicate that a cache containing a modified value corresponding to the address of the memory device can source the value;

a shared response is transmitted to indicate that a cache containing an unmodified value corresponding to the address of the memory device will not source the value; and a retry response is transmitted to indicate that a cache desires the requesting processor to re-issue the message.

8. The method of claim 6 wherein the retry response is assigned a highest priority.

9. The method of claim 7 wherein the shared intervention response is assigned a highest priority.

10. The method of claim 7 wherein the retry response is assigned a highest priority.

11. A computer system comprising:

a memory device;

an interconnect connected to said memory device;

a plurality of processing units connected to said interconnect, each processing unit having a cache for storing values from said memory device, each cache having means for transmitting a response to a message issued from a requesting processing unit, the message indicating that said requesting processing unit desires to read a value from an address of said memory device, wherein said transmitting means includes means for providing a shared intervention response to indicate that a particular cache contains a shared, unmodified copy of a value corresponding to said address and is the only cache entitled to directly source the value, each said response further having an associated priority, including the shared intervention response; and means for detecting each response and its associated priority, and forwarding a response with a highest priority to said requesting processing unit.

12. The computer system of claim 11 wherein each said cache includes means for snooping said interconnect for a message from said requesting processing unit.

13. The computer system of claim 11 wherein said shared intervention response is assigned a highest priority.

14. The computer system of claim 11 wherein said transmitting means further includes means for providing an invalid response to indicate that a cache does not contain any value corresponding to said address.

15. The computer system of claim 11 wherein said transmitting means further includes means for providing a modified intervention response to indicate that a cache containing a modified value corresponding to said address can source the value.

16. The computer system of claim 11 wherein said transmitting means further includes means for providing a shared response to indicate that a cache containing an unmodified value corresponding to said address will not source the value.

17. The computer system of claim 11 wherein said transmitting means further includes means for providing a retry response to indicate that a cache desires said requesting processor to re-issue the message.

18. The computer system of claim 11 wherein said transmitting means further includes means for providing:

an invalid response to indicate that a cache does not contain any value corresponding to said address;

a modified intervention response to indicate that a cache containing a modified value corresponding to said address can source the value;

a shared response to indicate that a cache containing an unmodified value corresponding to said address will not source the value; and a retry response to indicate that a cache desires said requesting processor to re-issue the message.

19. The computer system of claim 18 wherein said shared intervention response is assigned a highest priority.

20. The computer system of claim 18 wherein said retry response is assigned a highest priority.

* * * * *

UNITED STATES PATENT AND TRADEMARK OFFICE
CERTIFICATE OF CORRECTION

PATENT NO. : 5,940,864
DATED : August 17, 1999
INVENTOR(S) : Arimilli, et. al.

It is certified that error appears in the above-identified patent and that said Letters Patent is hereby corrected as shown below:

Title page, item [54] and col. 1, line 1, delete "PRIORIZATION" and replace with -- PRIORITIZATION--.

Signed and Sealed this

Twenty-seventh Day of June, 2000

Attest:

Q. TODD DICKINSON

Attesting Officer

Director of Patents and Trademarks